Figure 1:
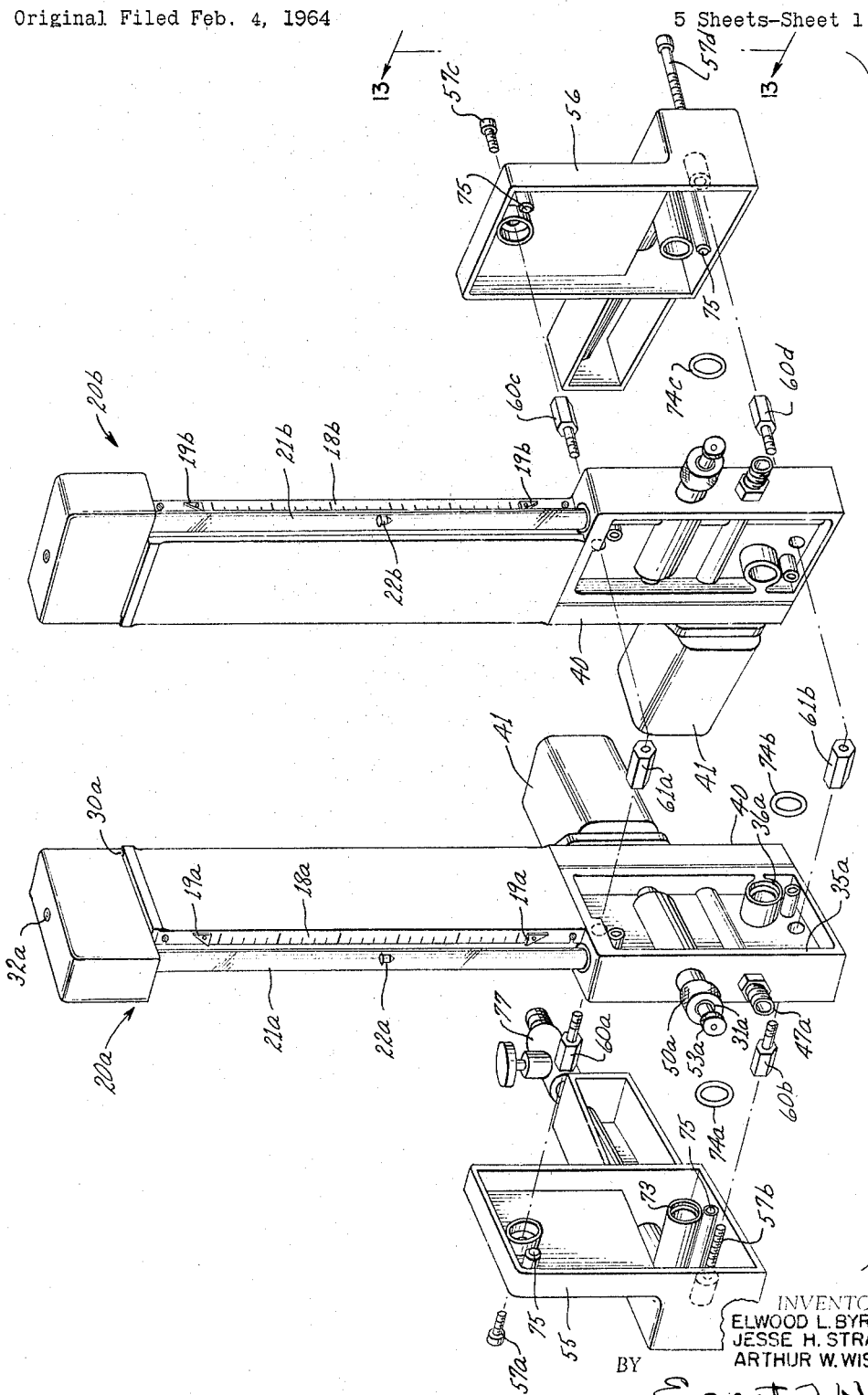

Dec. 6, 1966   E. L. BYRKETT ET AL   3,289,464
PNEUMATIC GAGING APPARATUS
Original Filed Feb. 4, 1964   5 Sheets-Sheet 1

INVENTORS
ELWOOD L. BYRKETT
JESSE H. STRAW
ARTHUR W. WISEMAN
BY Ernest J. Nix
ATTORNEY

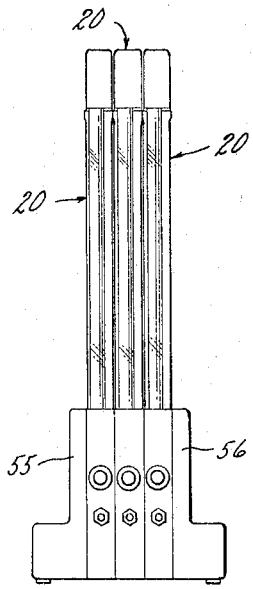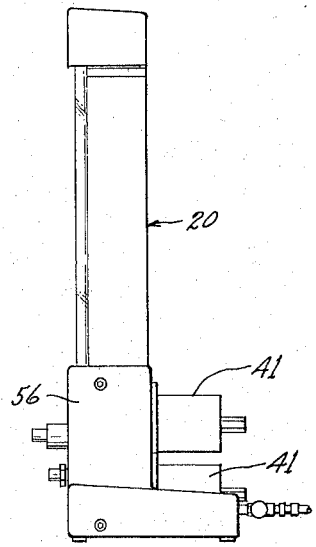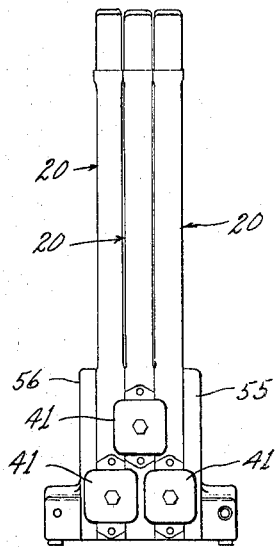
FIG.2  FIG.3  FIG.4
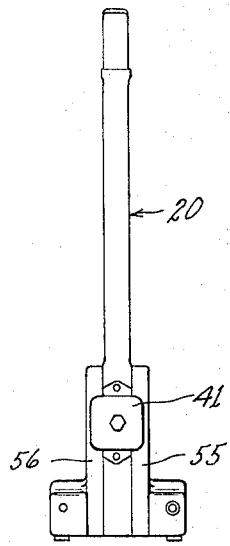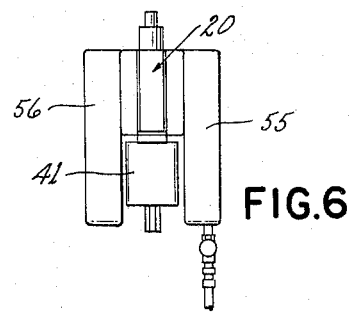
FIG.5  FIG.6

Dec. 6, 1966  E. L. BYRKETT ET AL  3,289,464
PNEUMATIC GAGING APPARATUS
Original Filed Feb. 4, 1964  5 Sheets-Sheet 3

INVENTORS
ELWOOD L. BYRKETT
JESSE H. STRAW
ARTHUR W. WISEMAN

BY Ernest J. Nix

ATTORNEY

Dec. 6, 1966 E. L. BYRKETT ET AL 3,289,464
PNEUMATIC GAGING APPARATUS
Original Filed Feb. 4, 1964 5 Sheets-Sheet 4
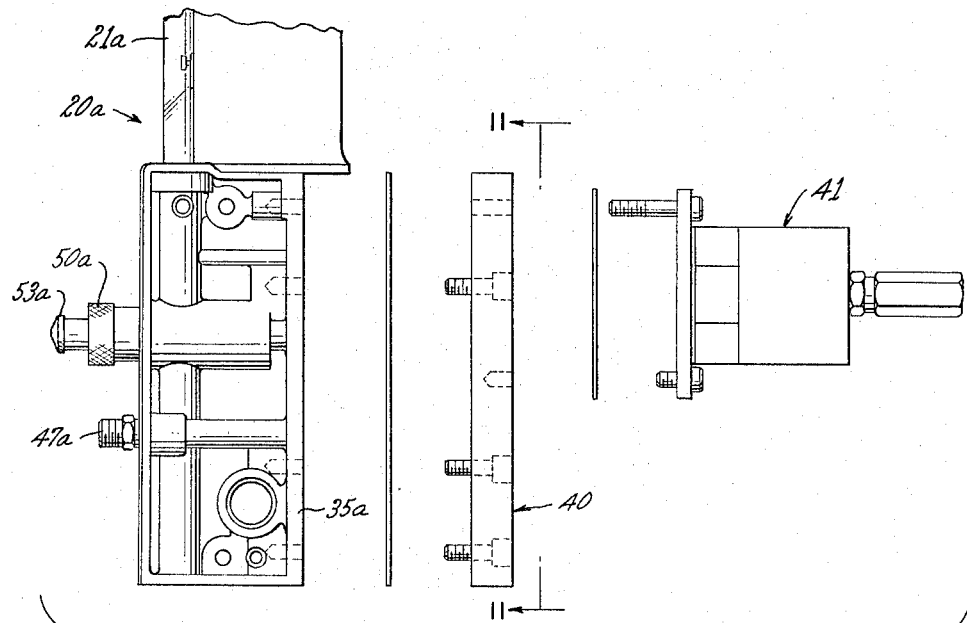
FIG.10
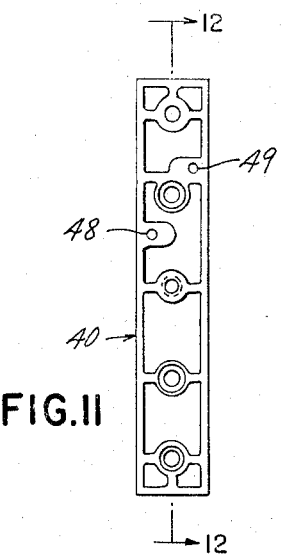
FIG.11  FIG.12
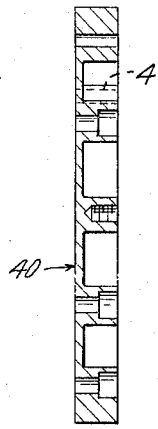
FIG.17
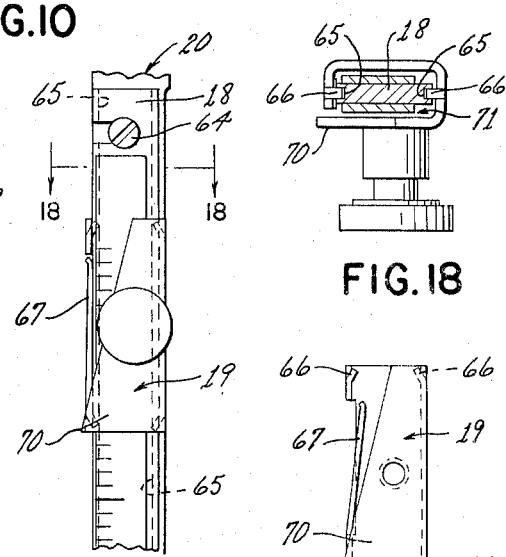
FIG.18
FIG.19
INVENTORS
ELWOOD L. BYRKETT
JESSE H. STRAW
ARTHUR W. WISEMAN
BY Ernest J. Hix
ATTORNEY

INVENTORS
ELWOOD L. BYRKETT
JESSE H. STRAW
ARTHUR W. WISEMAN 3,289,464
PNEUMATIC GAGING APPARATUS
Elwood L. Byrkett and Jesse H. Straw, Kettering, and Arthur W. Wiseman, Xenia, Ohio, assignors to The Sheffield Corporation, Dayton, Ohio, a corporation of Delaware
Continuation of abandoned application Ser. No. 344,894, Feb. 4, 1964. This application Dec. 22, 1965, Ser. No. 524,361
17 Claims. (Cl. 73—37.5)

This is a continuation of application Serial No. 344,894, filed Feb. 14, 1964 now abandoned.

This invention relates to indicating apparatus and more particularly to such an apparatus for use in pneumatic gaging circuits of the type applied to measurement and display of various product characteristics and particularly of product dimensions.

Such circuits are generally of the comparator type wherein air flow determined by a particular dimension gaged, for example, is indicated and, in effect, is compared with such indications as obtained in initially calibrating or "setting up" the apparatus with reference masters. One type of indicating apparatus widely employed in industry in such pneumatic measuring circuits utilizes an internally tapered transparent flow tube with an indicating float therein such as that shown in U.S. Patent 2,749,742, issued June 12, 1956.

Many such apparatuses are used for indicating only a single characteristic or dimension and thus employ only a single indicating tube. However, this basic approach is extremely useful and efficient where multiple dimensions are simultaneously gaged because the tubes for each dimension can be compactly grouped and by simply scanning the resultant float positions many dimensions can be simultaneously checked in an extremely rapid and accurate manner. Patent No. 2,858,615 issued November 4, 1958, illustrates an instance where a large number of tubes so arranged have been employed. However, even more tubes have been thus mounted in a single indicating apparatus and are used commonly in industry where it is desired to simultaneously indicate in a common display even larger numbers of dimensions.

It will thus be apparent that such indicating instruments or apparatuses are provided for applications ranging from those employing only a single indicating tube to those employing 40, or 50, or more such tubes in a single assembly. In prior known devices of this type, such as illustrated in the patents mentioned above, instruments were, in effect, manufactured for each application dependent upon the number of tubes employed. This is because there were elements in the assembly which were unique to the number of tubes. A review of Patent 2,749,742, which illustrates the instrument of this type most commonly employed in industry, will reveal that the hinged lid, base casting, and many other components are dimensioned as determined by the number of tubes employed.

This results in increased costs of manufacture because of the lack of repetitive quantity production of many of the components for such instruments. Increased costs also result from the necessity of manufacturing components unique to the number of tubes employed, delivering such components to the assembly area in a disciplined manner, and assembling them into the finished instrument or apparatus. Stocking problems and the maintenance of sufficient inventories are also rendered more difficult because of the variety of components involved. This particular construction also multiplies problems in the field and limits flexibility of the instruments in the hands of the users.

A multiple column or tube instrument, manufactured for use with particular gaging tooling and for the repetitive gaging of a particular part may well be obsoleted when the part is obsoleted because the number of the tubes employed were unique to that application. However, it is not possible in prior known devices without reconstruction to modify the instrument or apparatus to employ a greater or lesser number of tubes or columns for a further application.

It is accordingly, an object of this invention to avoid the deficiencies of these prior known apparatuses or instruments and provide an indicating apparatus of the column type for use in pneumatic measuring circuits which has features providing for reduced cost of manufacture and increased flexibility in assembly, and in disassembly and rearrangement for various applications.

It is a further object of this invention to provide such an indicating apparatus of modular construction with no components of the assembly being unique to the number of tubes employed therein, thus giving the ultimate in repetitive manufacture of common components and flexibility in scheduling an assembly of instruments for the maximum in manufacturing economy as well as full flexibility in the field and in the hands of users for adapting and re-arranging such modules with tube numbers as required for individual applications without diminishing in any respect the compact arrangement and efficient scanning possible through such close and compact assembly of parallel indicating tubes employed in measuring multiple dimensions or multiple product characteristics.

It is a further object of this invention to provide a module forming the major component of an indicating apparatus of the type referred to above, each said module being of substantially independent construction, including an indicating tube and float and connection for gaging tooling, having features for manufacture at reduced cost without sacrificing performance and for ready independent assembly, dis-assembly and re-assembly in an indicating apparatus of various number of tubes through mating assembly of the components of the apparatus and placement in communication with such other components without external piping, tubing, or manifolding, but solely through assembly of the module and other components of the apparatus together.

It is a further object to provide such a module as referred to in the object next above, wherein such placement in pneumatic communication is achieved in assembly by means of a transverse air supply passage provided in each such module opening at opposite sides of the module and being brought into common assembly and communication with other such modules or supporting components of the apparatus solely by assembly together.

It is a further object of this invention to provide such an apparatus employing module means having such transverse communicating passages extending therethrough for assembly with supporting components or foot units at each side thereof, at least one of said foot units having a connection for communication with a supply of air under pressure and a supply outlet communicating therewith terminating in an opening in one side of the unit brought into pneumatic communication with the supply passages extending transversely through the module means upon assembly of the components together in a complete indicating apparatus.

Figures 7, 8, 9:
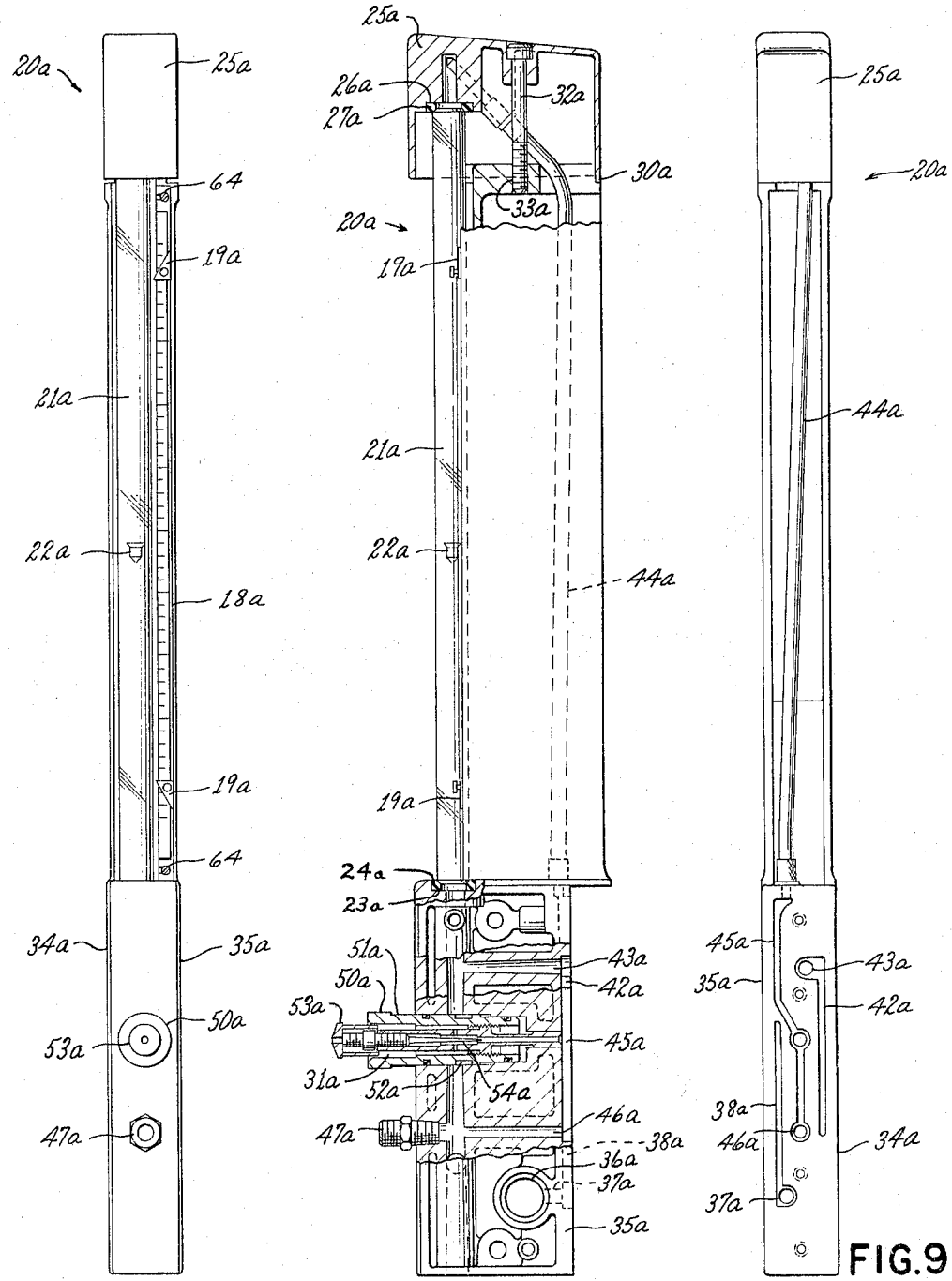
Figure 13:
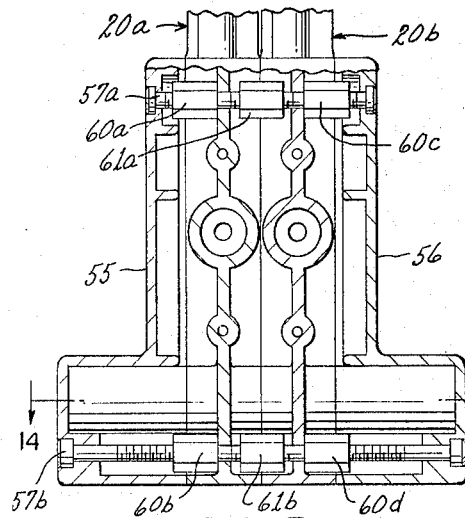
Figure 14:
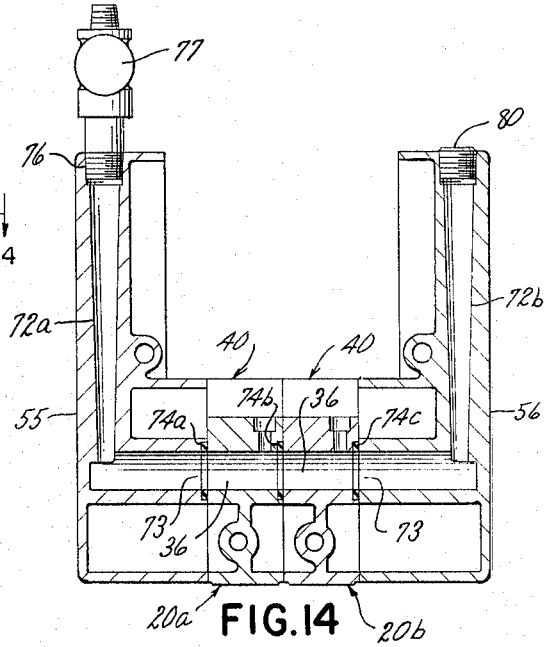
Figure 15:
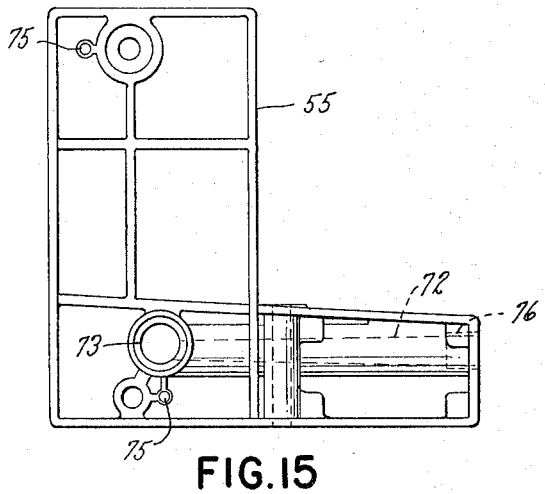
Figure 16:
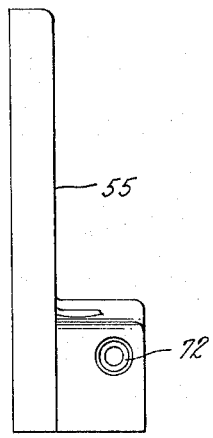

Other objects and advantages of this invention will be apparent from the following description, the appended claims, and the accompanying drawings, in which, FIG. 1 is an exploded view of one exemplary embodiment of the indicating apparatus of this invention illustrating the arrangement of the modules and associated components in a two column instrument, FIGS. 2, 3, and 4 show the front, side, and rear views respectively in another exemplary embodiment of the invention showing a fully assembled three column instrument and the disposition of the pressure regulators associated therewith, FIGS. 5 and 6 show the rear and top views respectively in still another exemplary embodiment of the invention having a single module, FIG. 7 is a front view, FIG. 8 is a side view with parts in section and parts broken away, and FIG. 9 a rear view, all of an exemplary module forming the major basic component of the indicating apparatus, FIG. 10 is an exploded view of the lower end of one of the modules of FIG. 1 illustrating a pressure regulator and its supporting reversible manifold block, FIGS. 11 and 12 are sectional views taken on lines 11—11 and 12—12 of FIGS. 10 and 11 respectively, FIG. 13 is a cross sectional view of the lower portion of the assembled components of the embodiment illustrated in FIG. 1 taken on line 13—13 of that figure, FIG. 14 is a view on the line 14—14 of FIG. 13, FIG. 15 is a view of the inside of the left foot unit of FIG. 1, FIG. 16 is a rear view of the foot unit illustrated in FIG. 15, and FIGS. 17-19 illustrate the scale and marker used with this indicating apparatus.

Basically the indicating apparatus comprises indicating module means assembled between supporting module means including foot units. The module means can include one or more substantially independent indicating modules and each module includes major air supply passage means extending transversely through said module means and opening at the transversely opposed side faces thereof in coupling ends, so that one or more modules can be assembled with foot units and with each other.

The module is the basic component of the invention and the versatility and flexibility of each module will be readily apparent by referring initially to the embodiment of the invention illustrated in FIG. 1 in which two modules 20a and 20b are shown in a two column instrument. Each module 20a and b includes an upright air flow indicating tube 21a and b containing float 22a and b respectively. Each float is positioned along the tube by air flow therethrough in response to the product characteristic or dimension being measured when the module is connected in a known manner to a regulated source of air and the required tooling. The position of each float, 22a and b, is referenced to an associated scale 18a or b, each having reference markers 19a or b adjustably positioned therealong.

Because each module in an apparatus is basically identical, only module 20a, illustrated in more detail in FIGS. 7, 8, and 9, will be presently described. It is to be understood that the description is fully applicable to all modules in the various illustrated embodiments of the invention which differ only in the number of modules employed.

Mounting means detachably supporting tube 21a along the forward face of unit 20a include receiving means or recess 23a and a gasket 24a for supporting the lower tube end, and tube cap 25a at the upper end of module 20a forming in major outline a continuation of the general transverse configuration of unit 20a. The cap 25a includes a receiving recess 26a adjacent its forward end for supporting a gasket 27a which is brought into sealing engagement with the upper end of tube 21a. Cap 25a includes transverse pivot means such as a projection 30a adjacent its rearward end and extending below the lower end of cap 25a. Clamp means such as a bolt 32a are provided for drawing tube cap 25a downwardly about projection 30a for clamping tube 21a in module 20a and operate reversely for releasing movement thereof. Projection 30a causes the cap to tilt forward sufficiently so that tube 21a is sealed and supported firmly when bolt 32a is threaded into a cooperating threaded portion 33a in module 20a.

Module 20a has side faces in the lower portion thereof having parallel outer assembly surfaces 34a and 35a at each side. An air supply passage 36a extends transversely through unit 20a and opens at its opposite ends in the transversely opposed faces 34a and 35a for mating relationship with cooperating passages in adjoining components. The parallel side faces 34a and 35a are arranged to mate with vertical faces of adjoining cooperating foot units in a single column instrument or with cooperating adjoining module faces and/or foot units in an apparatus having a plurality of columns.

First passage means are provided in module 20a for communication between supply passage 36a and the lower end of tube 21a. This first passage means include passages 37a and 38a in the lower portion of module 20a which communicate through a manifold block 40, illustrated in FIG. 10 and later described in more detail, to a regulator 41, and air from regulator 41 enters another passage 42a which is in communication with a passage 43a and then flows upward through indicating tube 21a to position the float 22a therealong in response to a dimension being measured.

Further passage means includes flexible conduit 44a communicating with the upper end of tube 21a through upper gasket 27a by connection to tube cap 25a, and passages 45a and 46a leading to connection means such as fitting 47a at the forward face of module 20a for connection to gaging tooling. Flexible conduit 44a accommodates movement of tube cap 25a during its clamp- and unclamping movements. Thus it is seen that a change of flow to the tooling provides a change in the position of float 22a.

Commercially available pressure regulators commonly employed in these instruments have widths greater than the limited transverse dimension of the modules of this invention. When such regulators are employed it is therefore necessary to mount them at alternate raised and lowered overlapping positions—note particularly the arrangements of FIGS. 1 and 4. Manifold block 40 shown particularly in FIGS. 10-12 accomplishes this purpose by serving as an adapter which may be rotated 180 degrees to bring the passages to and from the regulator into proper cooperating relationship with the passages in the rear of each module and with the regulator in either the raised or lowered position.

Referring particularly to FIGS. 9-12 it will be seen that with the regulator mounted in the raised position a port 48 in block 40 which registers with the inlet port to regulator 41 will be in communication at the upper end of passage 38a, and port 49 in block 40 which registers with the outlet from regulator 41 will be in communication with the upper end of passage 42a. To mount the regulator in the lowered position, block 40 is rotated 180 degrees. As will be apparent from the drawings the relationship of holes and bolts is such that rotation is readily possible. Note that the regulator is not rotated but is simply positioned downwardly and re-attached to block 40. In this lowered position port 49 in block 40 now registers with the inlet port to the regulator 41 and will be in communication at the lower end of passage 38a while port 48 registers with the outlet port from the regulator 41 and will be in communication with the lower end of passage 42a. As will be readily apparent the flow of regulated air through the module will be the same irrespective of the position of the regulator.

In calibration or "setting-up" the apparatus flow is adjustably by-passed around tube 21a by rotating knurled knob 50a extending from cylindrical body member 51a causing an annular groove 52a therein to communicate more or less with flow from passage 43a thus varying the relative proportion of flow through the tube and through tooling connection 47a. This adjustment is used in conjunction with knurled knob 53a provided on a needle valve 54a concentric with member 51 which is rotated to move valve 54a in and out to control flow through a passage 31a to atmosphere.

Support means including foot units 55 and 56 are mounted on each side of modules 20a and 20b, as illustrated in FIGS. 1 and 13–16. Coupling means are provided for readily fastening modules 20a and 20b to each other and to foot units 55 and 56. The coupling means include bolts 57a and b which are inserted through foot unit 55 and threaded into cooperating combination assemblies 60a and 60b each having a nut at one end and a bolt at the opposite end as one integral assembly. Assemblies 60a and b are fastened to module 20a in the embodiment illustrated in FIG. 1 by cooperating nuts 61a and b. Module 20b is fastened to module 20a by the threading assemblies 60c and d into the opposite ends of nuts 61a and b and foot unit 56 is then fastened to module 20b by bolts 57c and d thus forming an integral indicating apparatus.

The coupling means for the single column instrument shown in FIGS. 5 and 6, would consist merely of two pairs of bolts 57, one pair of assemblies 60 and a pair of nuts 61. The coupling means for the three column instrument illustrated in FIGS. 2–4 would require units described above for the apparatus illustrated in FIG. 1 plus another pair of assemblies 60. Thus it is seen it is readily possible to add any desired number of modules to a one column apparatus merely by adding the necessary number of modules plus a corresponding number of pairs of combination assemblies 60. Because each module 20 is of substantially independent construction, and because of the mounting versatility, complete flexibility of usage of any number of columns is achieved in an indicating apparatus simply by providing the requisite number of modules 20, a pair of foot units 55 and 56, and the coupling means as previously described.

As illustrated particularly in FIGS. 17–19, scale means 18 is detachably fastened within the outline formed by the vertical face mating with adjacent modules, in spaced relation from each module 20 by screws 64 and may include markings on both sides selectively used by reversing the scale mounting. Marker means 19 are adjustably mounted and relatively slidable on scale 18 to mark reference positions for float 22. Guide means such as channels 65 are provided at each side of scale 18 to guide marker 19. Marker 19 has means such as projections 66 which cooperate within both channels 65 to hold and guide the marker for movement therealong. Yielding means such as a spring 67 urges marker 19 and scale 18 toward each other along channels 65 to hold the marker at any pre-selected position therealong. As will be seen in FIG. 18 the indicator 70 of marker 19 is thus carried in close indicating association with scale 18 but spaced slightly therefrom. Thus with this arrangement there is no physical contact between the marker and face of the scale, as indicated at 71, as they relatively slide resulting in increased life of the relatively slidable units.

In the illustrated embodiment each foot unit 55 and 56 includes passage means 72 along its extended portion provided with a connection at its rearward end for coupling to a source of air under pressure. At its forward end this passage means extends generally transverse the foot unit—terminating in a supply outlet in the mating face of the foot unit and in axial alignment for registering communication at 73 with the supply passage 36 of each module assembly. O ring seals 74a, b, and c (see FIGS. 1 and 14), each seated in one of the mating faces at each juncture, extend slightly beyond the associated face when free so that as the components are drawn together in assembly the outlet passages of the foot units and supply passages of the modules are placed in sealed communication to assure a continuous air supply through the indicating tubes free of leaks. Each foot (see FIGS. 1 and 13–16) includes guide pins 75 which cooperate with holes in an adjacent module 20 to properly relatively position the foot and module. At least one of said foot units in each indicating apparatus includes connection means as previously referred to including a threaded portion 76 for connection to a source of air under pressure. A valve 77 is normally provided upstream of passage 72a for shutting off flow to the apparatus and the other passage 72b of the other foot unit is closed off with a plug 80. In the embodiment of FIG. 1 it is necessary to provide a supply of air only through foot 55 as illustrated. However, in those applications where a very large number of modules are assembled in one indicating apparatus it may be desirable because of large flow demand to provide air to both ends of the aligned supply passage 36 through both foot units 55 and 56.

Thus it is seen that an indicating device is provided which includes units of modular construction with no components of the assembly being unique to the number of tubes or columns employed enabling great economy of manufacture and complete flexibility of assembly, and operation. Complete flexibility in assembly is achieved in a highly efficient manner by simply including the number of independent modules desired in the module means between the supporting units or feet, drawing them together in a simple manner into assembly while automatically placing all flow passages in sealed communication.

While the forms of apparatus herein described constitute preferred embodiments of the invention it is to be understood that the invention is not limited to these precise forms of apparatus, and that changes may be made therein without departing from the scope of the invention which is defined in the appended claims.

What is claimed is:

1. A module forming the major component of an indicating apparatus for use in pneumatic gaging circuits, said module being adapted for connection to a supply of air under pressure and having an outlet for connection to gaging tooling wherein the flow of said air is controlled in accordance with a characteristic of a product being measured, said module comprising a longitudinally extended unit of limited transverse dimension between its side faces and adapted for vertical mounting, mounting means in said unit detachably supporting a transparent indicating tube along the forward face of said unit, an indicating float in said tube positioned therealong in accordance with the flow upward through said tube, an air supply passage extending transversely through said unit, opening at its opposite ends in the transversely opposed side faces thereof for mating relationship at each end with adjoining components of said apparatus, first passage means in said unit for communication between said supply passage and the lower end of said tube, connection means at the forward face of said unit for connection to gaging tooling, further passage means from the upper end of said tube leading to said connection means, and side faces and top, rear, and bottom surfaces forming the basic exposed configuration within which each module is a complete operative unit with components thereof being independent and self-sufficient when used singly and when readily assembled into an operating assembly comprising a plurality of such modules coupled together, whereby said module provides the maximum in versatility in that no part of such a module or any complete operative assembly of a plurality thereof is unique to the number of modules employed.

2. A module as set forth in claim 1 wherein said mounting means detachably supports said transparent indicating tube along the forward face of said unit and in the upper portion thereof, the side faces of said unit in the lower portion thereof having parallel outer assembly surfaces at each side of said unit for vertical disposition when mounted and for cooperative mating with similar surfaces on adjoining components of said apparatus in assembly, said air supply passage extending transversely through said unit in said lower portion thereof.

3. A module as set forth in claim 1 wherein the said mounting means for said indicating tube includes receiving means in said unit for the lower tube end and a tube cap at the upper end of said unit forming in major cutline a continuation of the general transverse configuration of said unit, said cap including transverse pivot means adjacent its rearward end and a receiving recess adjacent its forward end for engagement with the upper end of said tube, and clamp means for drawing said tube cap downwardly about said pivot means for clamping said tube in said module and operative reversely for releasing movement, said further passage means including means communicating with the upper end of said tube through the receiving recess of said tube cap.

4. A module as set forth in claim 1 wherein said first passage means includes a supply outlet from said air supply passage and a supply inlet, both opening to the rear of the lower portion of said unit, a pressure regulator having inlet and outlet openings, a manifold block for supporting said regulator displaced toward one end of said block, and connection means for clamping said manifold block to the rear face of the lower portion of said unit in either of a first and an inverted position, with said regulator in corresponding upper and lower positions connected in each instance to said supply inlet and supply outlet at the rearward face of said unit for regulating air supplied to said tube from said air supply passage.

5. A module forming the major component of an indicating apparatus for use in pneumatic gaging circuits, said module being adapted for connection to a supply of air under pressure and having an outlet for connection to gaging tooling wherein the flow of said air is controlled in accordance with a characteristic of a product being measured, said module comprising a longitudinally extended unit of limited transverse dimension between its side faces and adapted for vertical mounting, mounting means in said unit detachably supporting a transparent indicating tube along the forward face of said unit, an indicating float in said tube positioned therealong in accordance with the flow upward through said tube, scale means mounted on said module within an outline formed by the adjacent vertical mating face and in operative association along said tube, marker means adjustably mounted and relatively slidable on said scale means within said outline to indicate reference positions for said float, an air supply passage extending transversely through said unit, opening at its opposite ends in the transversely opposed side faces thereof for mating relationship at each end with adjoining components of said apparatus, first passage means in said unit for communication between said supply passage and the lower end of said tube, connection means at the forward face of said unit for connection to gaging tooling, further passage means from the upper end of said tube leading to said connection means, and side faces and top, rear and bottom surfaces forming the basic exposed configuration within which each module is a complete operative unit with components thereof being independent and self-sufficient when used singly and when readily assembled into an operating assembly comprising a plurality of such modules coupled together, whereby such module provides the maximum in versatility in that no part of such a module or any complete operative assembly of a plurality thereof is unique to the number of modules employed.

6. A module as set forth in claim 5 wherein said scale means includes guiding grooves along each side thereof displaced from the scale face for guiding said marker means, said marker means being integrally formed of a single piece of sheet metal extending from one of said grooves transversely across the rear of said scale means past the second of said grooves and terminating in an indicator in close indicating association with the face of said scale but displaced slightly therefrom whereby there is no physical contact between the indicator of said marker means and the face of the scale resulting in increased life of said relatively slidable units, guiding projections at each side of said marker means bent inwardly for guiding cooperation within each of said grooves and a spring element bent inwardly for frictional engagement with one side of said scale means for frictionally holding said marker means in its adjusted positions.

7. A module forming the major component of an indicating apparatus for use in pneumatic gaging circuits, said module being adapted for connection to a supply of air under pressure and having an outlet for connection to gaging tooling wherein the flow of said air is controlled in accordance with a characteristic of a product being measured, said module comprising a longitudinally extended unit of limited transverse dimension between its side faces and adapted for vertical mounting, mounting means in said unit detachably supporting a transparent indicating tube along the forward face of said unit in the upper portion thereof, an indicating float in said tube positioned therealong in accordance with the flow upward through said tube, said module having assembly surfaces at each side thereof for mating assembly with adjoining components of the apparatus and vertical disposition of said tube in such assembly, a major air supply passage extending transversely through the body of said unit in its lower portion and forming a unitary part thereof, said major passage terminating at corresponding locations at each side of the lower portion of said unit in oppositely disposed open coupling ends and having a length commensurate with the effective displacement between said assembly surfaces for mating relationship of each of said coupling ends with corresponding passages of adjoining components of said apparatus, first passage means including a passage formed unitarily with said unit of reduced size relative to said major supply passage and communicating transversely therewith for communication between said supply passage and the lower end of said tube.

connection means at the forward face of said unit for connection to gaging tooling, and further passage means from the upper end of said tube leading to said connection means.

8. A module as set forth in claim 7 wherein said first passage means includes pressure regulator means, and means mounting said regulator means at the rear of the lower portion of said unit as a unitary part thereof.

9. An indicating apparatus for use in pneumatic gaging circuits, said apparatus including vertically extended module means of limited transverse dimension between the side faces thereof, said module means including transparent indicating tube and float means vertically mounted at the forward face thereof, connection means at the forward face of said module means for connection to gaging tooling, air supply passage means extending transversely through said module means and opening in the transversely opposed side faces thereof, passage means in said module means for placing said supply passage means in communication with said tube means and said tube means in communication with said connection means, support means including supporting foot units for mounting on each side of said module means, at least one of said foot units including connection means for connection to a source of air under pressure and passage means therethrough from said connection means terminating in a supply outlet in one side face of said foot unit, and coupling means for fastening said module means between and to said foot units at each side thereof for vertical support of said module means and placement of said supply outlet in registering communication with the supply passage means of said module means for a supply of air under pressure thereto through said one foot unit.

10. An apparatus as set forth in claim 9 wherein said coupling means include identical fastening means and pairs of combination assemblies, said pairs being identical in number with the number of modules employed.

11. An indicating apparatus for use in pneumatic gaging circuits, said apparatus comprising indicating module means including at least one indicating module, each said indicating module comprising a longitudinally extended unit of limited transverse dimension between its side faces and adapted for vertical mounting, mounting means in said unit detachably supporting a transparent indicating tube along the forward face of said unit in the upper portion thereof, an indicating float in said tube positioned therealong in accordance with the flow upward through said tube, said unit having assembly surfaces at each side thereof for mating assembly with adjoining components of the apparatus and vertical disposition of said tube in such assembly, a major air supply passage extending transversely through the body of said unit in its lower portion and forming a unitary part thereof, said major passage terminating at corresponding locations at each side of the lower portion of said unit in oppositely disposed open coupling ends and having a length commensurate with the effective displacement between said assembly surfaces for mating relationship of each of said coupling ends with corresponding passages of adjoining components of said apparatus, first passage means including a passage formed unitarily with said unit of reduced size relative to said major supply passage and communicating transversely therewith for communication between said supply passage and the lower end of said tube, connection means at the forward face of said unit for connection to gaging tooling, further passage means from the upper end of said tube leading to said connection means, supporting modules for assembly at each side of said module means;

at least one of said supporting modules including connection means for connection to a source of air under pressure and passage means therethrough from said connection means terminating at the assembly side face of said supporting module in a supply outlet providing an open coupling end, the coupling end of said supply outlet being of similar dimension with said major supply passage and correspondingly located relative to its respective assembly face for coupling engagement in alignment with the opposing coupling end of said supply passage in assembly;

and means for detachably fastening said indicating module means between and to said supporting modules at each side thereof for vertical support of said module means and placement of said supply outlet in aligned coupling with the major supply passage of said module means for supply of air under pressure thereto.

12. A module forming the major component of an indicating apparatus for use in pneumatic gaging circuits, said module being adapted for connection to a supply of air under pressure and having an outlet for connection to gaging tooling wherein the flow of said air is controlled in accordance with a characteristic of a product being measured, said module comprising a longitudinally extended unit of limited transverse dimension between its side faces and adapted for vertical mounting, mounting means in said unit detachably supporting a transparent indicating tube along the forward face of said unit, an indicating float in said tube positioned therealong in accordance with the flow upward through said tube, air supply passage means in said unit for communication with the lower end of said tube, connection means at the forward face of said unit for connection to gaging tooling, further passage means from the upper end of said tube leading to said connection means, and said faces and top, rear, and bottom surfaces forming the basic exposed configuration within which each module is a complete operative unit with components thereof being independent and self-sufficient when used singly and when readily assembled into an operating assembly comprising a plurality of such modules coupled together, whereby said module provides the maximum in versatility in that no part of such a module or any complete operative assembly of a plurality thereof is unique to the number of modules employed.

13. A module forming the major component of an indicating apparatus for use in pneumatic gaging circuits, said module being adapted for connection to a supply of air under pressure and having an outlet for connection to gaging tooling wherein the flow of said air is controlled in accordance with a characteristic of a product being measured, said module comprising a longitudinally extended unit of limited transverse dimension between its side faces and adapted for vertical mounting, mounting means in said unit detachably supporting a transparent indicating tube along the forward face of said unit, indicating means in said tube positioned therealong in accordance with the characteristic of the product being measured, an air supply passage extending transversely through said unit, opening at its opposite ends in the transversely opposed side faces thereof for mating relationship at each end with adjoining components of said apparatus, a connection at the forward face of said unit for connection to gaging tooling, further passage means in said unit communicating between said air supply passage and said connection including means for positioning said indicating means in accordance with flow through said connection and to said tooling, and side faces and top, rear, and bottom surfaces forming the basic exposed configuration within which each module is a complete operative unit with components thereof being independent and self-sufficient when used singly and when readily assembled into an operating assembly comprising a plurality of such modules coupled together, whereby said module provides the maximum in versatility in that no part of such a module or any complete operative assembly of a plurality thereof is unique to the number of modules employed.

14. A module forming the major component of an indicating apparatus for use in pneumatic gaging circuits, said module being adapted for connection to a supply of air under pressure and having an outlet for connection to gaging tooling wherein the flow of said air is controlled in accordance with a characteristic of a product being measured, said module comprising a longitudinally extended unit of limited transverse dimension between its side faces and adapted for vertical mounting, mounting means in said unit detachably supporting a transparent indicating tube along the forward face of said unit, an indicating float in said tube positioned therealong in accordance with the flow upward through said tube, an air supply passage extending transversely through said unit, opening at its opposite ends in the transversely opposed side faces thereof for mating relationship at each end with adjoining components of said apparatus, a connection at the forward face of said unit for connection to gaging tooling, further passage means in said unit communicating between said air supply passage and said connection including means providing flow upward through said indicating tube in accordance with the flow through said connection and to said tooling, and side faces and top, rear, and bottom surfaces forming the basic exposed configuration within which each module is a complete operative unit with components thereof being independent and self-sufficient when used singly and when readily assembled into an operating assembly comprising a plurality of such modules coupled together, whereby said module provides the maximum in versatility in that no part of such a module or any complete operative assembly of a plurality thereof is unique to the number of modules employed.

15. A module as set forth in claim 14 wherein said mounting means detachably supports said transparent indicating tube along the forward face of said unit and in the upper portion thereof, the side faces of said unit in the lower portion thereof having parallel outer assembly surfaces at each side of said unit for vertical disposition when mounted and for cooperative mating with similar surfaces on adjoining components of said apparatus in assembly, said air supply passage extending transversely through said unit in said lower portion thereof.

16. A module as set forth in claim 14 wherein said further possage means includes a supply outlet from said air supply passage and a supply inlet, both opening to the rear of the lower portion of said unit, a pressure regulator having inlet and outlet openings, a manifold block for supporting said regulator displaced toward one end of said block, and connection means for clamping said manifold block to the rear face of the lower portion of said unit in either of a first and an inverted position, with said regulator in corresponding upper and lower positions and connected in each instance to said supply inlet and supply outlet at the rearward face of said unit for regulating air supplied to said tube from said air supply passage.

17. An indicating apparatus for use in pneumatic gaging circuits, said apparatus comprising indicating module means including at least one indicating module, each said indicating module comprising a longitudinally extended unit of limited transverse dimension between its side faces and adapted for vertical mounting, mounting means in said unit detachably supporting a transparent indicating tube along the forward face of said unit in the upper position thereof, an indicating float in said tube positioned therealong in accordance with the flow upward through said tube, said unit having assembly surfaces at each side thereof for mating assembly with adjoining components of the apparatus and vertical disposition of said tube in such assembly, a major air supply passage extending transversely through the body of said unit in its lower portion and forming a unitary part thereof, said major passage terminating at corresponding locations at each side of the lower portion of said unit in oppositely disposed open coupling ends and having a length commensurate with the effective displacement between said assembly surfaces for mating relationship of each of said coupling ends with corresponding passages of adjoining components of said apparatus, first passage means including a passage formed unitarily with said unit of reduced size relative to said major supply passage and communicating transversely therewith for communication with said supply passage, a connection at the forward face of said unit for connection to gaging tooling, further passage means in said unit communicating between said first passage means and said connection including means providing flow upward through said indicating tube in accordance with the flow through said connection and to said tooling, supporting modules for assembly at each side of said module means;

at least one of said supporting modules including connection means for connection to a source of air under pressure and passage means therethrough from said connection means terminating at the assembly side face of said supporting module in a supply outlet providing an open coupling end, the coupling end of said supply outlet being of similar dimension with said major supply passage and correspondingly located relative to its respective assembly face for coupling engagement in alignment with the opposing coupling end of said supply passage in assembly;

and means for detachably fastening said indicating module means between and to said supporting modules at each side thereof for vertical support of said module means and placement of said supply outlet in aligned coupling with the major supply passage of said module means for supply of air under pressure thereto.

No references cited.

LOUIS R. PRINCE, *Primary Examiner.*